UNITED STATES PATENT OFFICE.

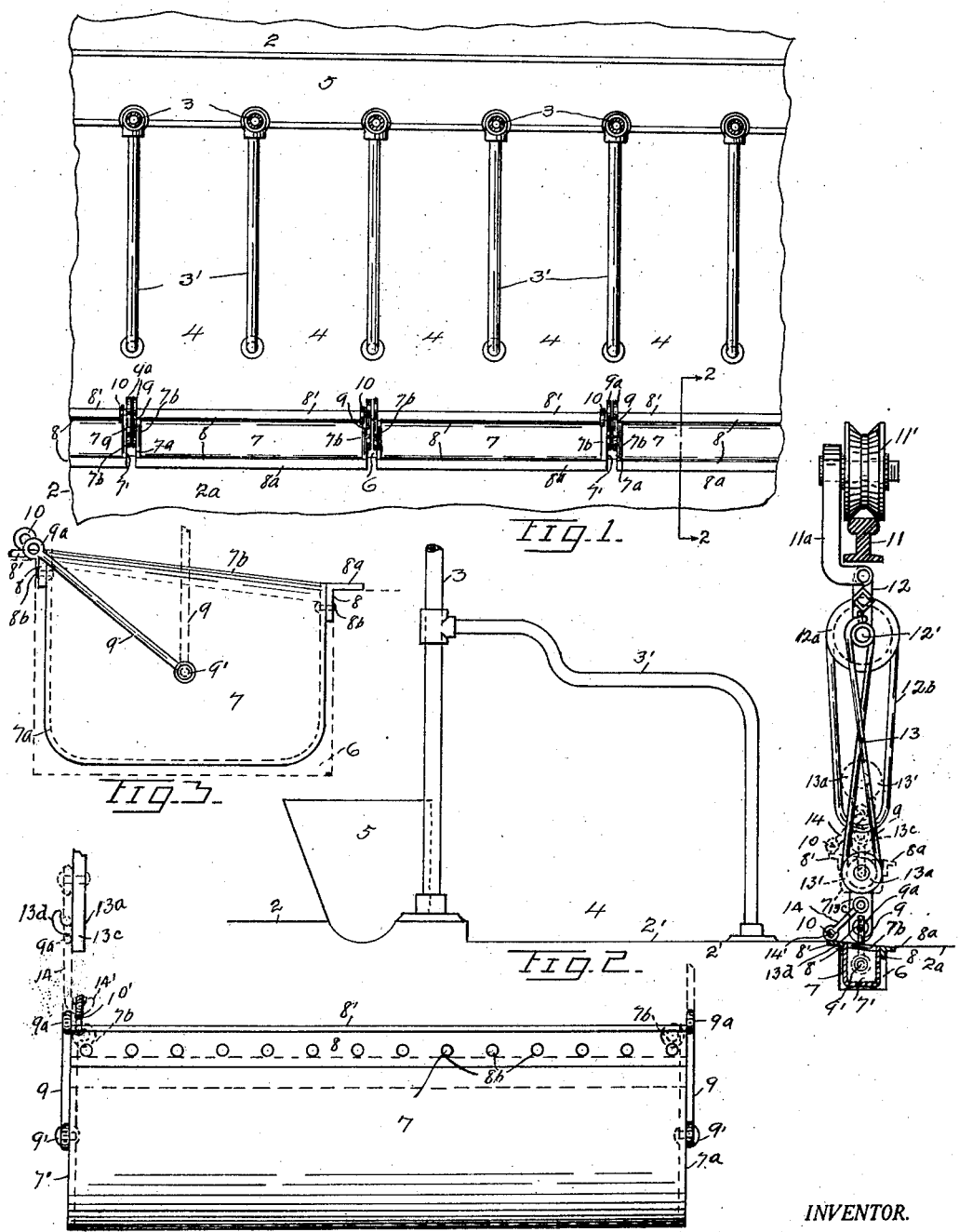

ALFRED L. BISHMAN, OF SYRACUSE, NEW YORK.

LITTER-COLLECTOR.

1,400,516.    Specification of Letters Patent.    Patented Dec. 20, 1921.

Application filed December 6, 1920. Serial No. 428,692.

*To all whom it may concern:*

Be it known that I, ALFRED L. BISHMAN, a citizen of the United States, residing at Syracuse, in the county of Onondaga and State of New York, have invented certain new and useful Improvements in Litter-Collectors, of which the following is a specification.

This invention relates to improvements in litter collectors, designed for use in connection with dairy barns and the like, and has for its particular object to provide novel, simple, handy and sanitary means for collecting the litter and ordure during the occupancy of the barns by cattle and other animals. A further object is to provide novel and simple means for readily removing the litter collectors at certain periods without requiring the manual handling of the same and without leaving any trace of the litter behind. And a further object is to provide novel means for preventing the accidental tilting and discharging of the collectors while the latter are being carried from the barns.

I attain these objects by the means set forth in the detailed description which follows, and as illustrated by the accompanying drawing, in which—

Figure 1 is a broken plan view of the floor of a dairy barn, showing a plurality of the litter collectors disposed at the rear of the stalls. Fig. 2 is a vertical cross-section, substantially on line 2—2 of Fig. 1. Fig. 3 is an enlarged end view of one of the collectors. And Fig. 4 is a side elevation of the same.

In the drawing, 2 represents the floor of a dairy or other barn. 3 and 3′ are the parts which divide a portion of the floor space into stalls 4 to receive and separate the cattle. 5 is the common manger. 6 represents the usual gutter which extends lengthwise in the barn at the rear ends of the stalls, the said gutter having for its object the temporary collection of the litter and ordure, as well as for draining the floor.

The present invention relates to novel and sanitary means for collecting the litter and ordure common to dairy barns, and preferably comprises a plurality of similar elongated sheet metal trays or troughs 7, which are closed except at their top sides. These trays are loosely disposed end to end in the trough or gutter 6 and are supported—suspended in the gutter by means of the flanges 8′ and 8ª of angle irons 8, which are rigidly secured to the opposite sides of the trays, by rivets 8ᵇ. The floor portion 2′ including the stalls 4 is slightly elevated as compared with the walk 2ª, which extends along the outer side of the gutter 6, and the sides of the trays facing the stalls are correspondingly deeper than the opposite sides, as shown in Figs. 2 and 3. The ends 7′ and 7ª of the trays are provided with rolled or beaded portions 7ᵇ, which are preferably arranged flush with the tops of the angle irons. These beads stiffen the otherwise thin and flexible metal, and prevent the crushing of the metal and the injuring of the cattle, in case the latter tread upon the said ends. The opposite ends of each tray are fitted with similar rods 9, which are pivotally secured thereto by bolts 9′, which pass through loops or eyes, and the free ends of said rods are also formed into eyes 9ª. When the trays are disposed in the gutters (see Figs. 1 and 2), the rods 9 are preferably swung outwardly laterally toward the stalls, where the eyes 9ª usually rest upon the adjacent margins of the gutter. By this disposition and arrangement, the rods offer the least obstruction to the passage of the cattle or their attendants. The corresponding ends of the trays 7 are fitted with I-bolts 10, which are preferably secured to the horizontal flanges 8′ of the inner angle irons, as shown in Figs. 1, 2 and 3.

The empty trays 7 are placed in the gutter 6, as close to each other as the rods 9 will permit, so as to prevent the litter reaching the gutter. All the litter and ordure which accumulates during the occupancy of the stalls 4 is collected by the several trays, and at suitable intervals of time the attendants remove and empty the trays and return them to the gutter. The removal of the loaded trays is accomplished by means of a carrier mechanism, which will now be described: 11 represents an overhead track, which usually extends longitudinally through the barns directly over the gutter 6, and supports a grooved wheel or sheave 11′, which is journaled in a depending bracket 11ª. The bracket 11ª supports a frame 12 whose lower end in turn supports a shaft 12′, one end of the latter being fitted with a sheave 12ª which is rotated by a manually operable cable or chain 12ᵇ, for rotating the shaft 12′ in opposite directions. Similar cables or ropes 13 are employed for raising and lowering similar blocks 13ª and 13ᵇ (the latter not shown), which are preferably spaced the length of one of the trays. In order to effect the lifting of the trays, one end of each rope or cable 13 is made fast to the corresponding frame portion 12. The rope thence extends downwardly and around a sheave 13' which forms a part of one of the blocks. The rope 13 then extends upwardly and its opposite end is made fast to the shaft 12'. The rotation of the shaft 12' in opposite directions winds and unwinds the ropes 13 and correspondingly raises and lowers the blocks, the same as any ordinary block and tackle. Downwardly projecting lugs or arms 13ᶜ of the blocks are provided with hooks 13ᵈ which engage the eyes 9ª of rods 9, for lifting and for supporting the trays 7 while the latter are being removed from and returned to the gutter 6. One of the blocks, as 13ª, carries a rod 14, one end of which is pivoted to the lug 13ᶜ, while its other end is provided with a hook 14', which engages the I-bolt 10 (see Figs. 2 and 4) for preventing the accidental tilting and rocking of the loaded trays, while the latter are being lifted out of the gutter and carried away to the dump. When the time arrives for removing the trays 7, the operator trundles the carrier mechanism along the track 11 until it is positioned directly over one of the trays. He then manipulates the rope 12ᵇ for lowering the blocks to the full line position shown in Fig. 2. The free ends of the rods 9 are then attached to the hooks 13ᵈ of the blocks, and the rod 14 is hooked into the I-bolt 10. The operator then manipulates the rope 12ᵇ in the opposite direction, which lifts the tray to the dotted position shown in Fig. 2. The carrier mechanism may then be moved along the track 11 in the opposite direction toward the dump, where the tray is emptied and cleansed, after which the empty tray is returned to the gutter and another tray is removed, and so on, as described. In the preferred arrangement, one tray serves to collect the litter and dung from two adjacent stalls 4.

Having thus described my invention, what I claim, is—

1. In a litter collector, an elongated tray having a clear open top, the top edges along the opposite sides being provided with outwardly facing flanges, the flange at one side being in a higher plane than the flange at the opposite side, and the top edges of the ends of the tray rolled into beads which are disposed flush with said flanges, an I-bolt carried by one of the flanges, and similar lifting rods pivoted to the opposite ends of the tray, the free ends of said rods comprising loops adapted to be engaged by a carrier mechanism for lifting and carrying the tray.

2. In a litter and ordure collector, a tray-like metal body having an open top, the free end margins of said opening being beaded to prevent crushing when trodden upon, and one side of said body being deeper than the other side, angle irons secured to the opposite lateral top edges of the body, the horizontal portions of said irons being in different planes and adapted to support the body in a gutter whose lateral sides are of unequal depth, an I-bolt carried by one of said irons, rods pivoted to the opposite ends of the body adapted to be engaged by a carrier for raising and lowering the body, and means engaging said I-bolt for preventing the accidental tilting of the body while being handled by the carrier.

In testimony whereof I affix my signature.

ALFRED L. BISHMAN.